Figure 1:
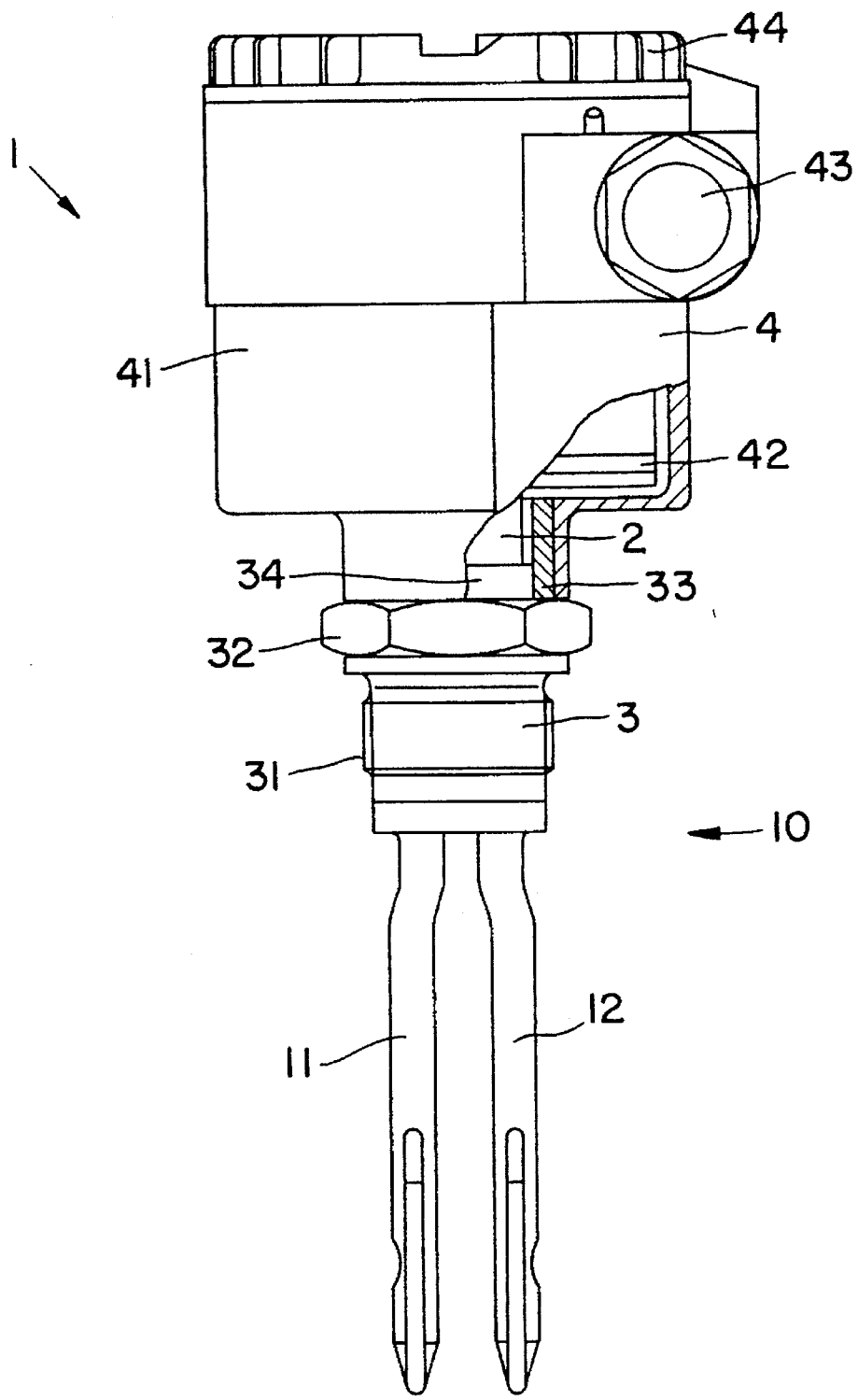

United States Patent [19]

Rottmar

[11] Patent Number: 5,625,343

[45] Date of Patent: Apr. 29, 1997

[54] DEVICE FOR DETERMINING AND/OR MONITORING A PREDETERMINED FILLING LEVEL

[75] Inventor: Werner Rottmar, Steinen, Germany

[73] Assignee: Endress + Hauser GmbH + Co., Maulburg, Germany

[21] Appl. No.: 244,520

[22] PCT Filed: Sep. 25, 1993

[86] PCT No.: PCT/DE93/00917

§ 371 Date: Jun. 1, 1994

§ 102(e) Date: Jun. 1, 1994

[87] PCT Pub. No.: WO94/08214

PCT Pub. Date: Apr. 14, 1994

[30] Foreign Application Priority Data

Oct. 2, 1992 [DE] Germany ............ 42 33 185.4

[51] Int. Cl.$^6$ ................................................. G08B 21/00
[52] U.S. Cl. ............................ 340/620; 340/618; 340/621; 324/602; 73/304 R; 73/290 V; 73/1.73
[58] Field of Search ............................ 340/618, 620, 340/621; 324/602, 619, 659; 73/290 R, 304 R, 290 V, 1 H; 422/63, 64, 100; 439/682, 683, 686, 689, 620

[56] References Cited

U.S. PATENT DOCUMENTS

| 3,943,440 | 3/1976 | Edwards | 340/620 |
| 4,594,584 | 6/1986 | Pfeiffer et al. | 340/620 |
| 4,735,240 | 4/1988 | Ziegler | 141/65 |
| 4,740,726 | 4/1988 | Umezawa | 310/316 |
| 5,135,002 | 8/1992 | Kirchner et al. | 128/672 |
| 5,191,316 | 3/1993 | Dreyer | 340/621 |

FOREIGN PATENT DOCUMENTS

| 2601446 | 1/1988 | France. |
| WO83/04435 | 12/1983 | WIPO. |
| WO88/01150 | 2/1988 | WIPO. |

*Primary Examiner*—Jeffery Hofsass
*Assistant Examiner*—Julie B. Lieu
*Attorney, Agent, or Firm*—Bose McKinney & Evans

[57] ABSTRACT

In devices for determining and/or monitoring a predetermined level with a sensor that is excited to perform mechanical oscillations at its self-resonant frequency by means of an electronic excitation circuit which is excited via a piezoelectric excitation and a reception transducer and an evaluation circuit for triggering display and/or switching processes, there exists the difficulty that the natural frequencies of the sensors are different due to the manufacturing conditions, and that the operating frequency must be adjusted individually for each sensor. This disadvantage makes repair and maintenance procedures quite difficult. The invention thus suggests arranging a plug connection between the electronic excitation circuit on one hand and the piezoelectric transducer on the other hand, whereby said plug connection encloses a characteristic impedance which is selected as a function of the measured, individual self-resonant frequency of the sensor, and whereby the characteristic impedance is connected electrically to the evaluation circuit in addition to producing the electrical connection between the excitation circuit and the piezoelectric transducer when the plug connection is closed electrically.

13 Claims, 4 Drawing Sheets

DEVICE FOR DETERMINING AND/OR MONITORING A PREDETERMINED FILLING LEVEL

DESCRIPTION

The invention pertains to a device for determining and/or monitoring a predetermined level with a sensor which is arranged in a container at the elevation of the level to be monitored in such a way that it comes in contact with the filling material once said material has reached the predetermined level, an electronic excitation circuit which excites the sensors to perform mechanical oscillations at its self-resonant frequency via a piezoelectric excitation and reception transducer, and with an evaluation circuit for triggering display and/or switching processes as a function of whether the frequency of the mechanical oscillations of the sensor exceeds or falls short of a operating frequency.

One example of such a device is disclosed in German Patent No. 3,931,453. In this known device, the sensor has two oscillating rods which are fastened onto a membrane at a distance from each other and may be excited such that they oscillate in opposite directions perpendicular to their longitudinal direction via a piezoelectric excitation and reception transducer which is excited by means of an electronic excitation circuit. However, there exists devices of this type in which the sensor only has one oscillating rod or is constructed in a different fashion without oscillating rods. The function of all such devices is based on the fact that the self-resonant frequency of the sensor is changed once the sensor comes in contact with the filling material. If the sensor is covered by the filling material, its self-resonant frequency is lower than if the sensor is not covered by the filling material. The operating frequency is selected such that it lies between the lower self-resonant frequency while the sensor is covered and the higher self-resonant frequency when the sensor is not covered. Once the evaluation circuit determines that the oscillation frequency of the sensor lies below the operating frequency, said fact indicates that the sensor is covered by the filling material, i.e., the level in the container has exceeded the elevation to be monitored. If the evaluation circuit determines that the oscillation frequency of the sensor lies above the operating frequency, said fact is an indication that the sensor is not covered by the filling material, i.e., the level lies below the elevation to be monitored.

The natural frequency of the sensors is different due to the manufacturing conditions. In addition, the operating frequency must be adjusted individually for each sensor since the self-resonant frequency of a covered and a non-covered sensor may lie relatively close together, in particular with liquids of low density. In such instances, the evaluation circuit is inevitably coupled with the sensor. If said evaluation circuit should be used in association with a different sensor, it must be readapted to this new sensor, which means that the self-resonant frequency of the new sensor must be known. This adaptation may usually not be carried out without certain problems at the place at which the device is used. This aspect makes it more difficult to carry out repair and maintenance procedures of the device.

The invention is based on the objective of creating a device of the type described initially in which each evaluation circuit may be used in association with any arbitrary sensor without requiring an individual adaptation of the evaluation circuit to the respective sensor.

According to the invention, this objective is attained by the fact that a plug connection is arranged between the electronic excitation circuit on one hand and the piezoelectric excitation and reception transducer on the other hand, whereby said plug connection produces the electrical connection between the electronic excitation circuit and the piezoelectric excitation and reception transducer and contains a receptacle mounting for a characteristic impedance which is connected electrically with the evaluation circuit when closing the plug connection, and whereby the value of resistance of the characteristic impedance is in definite relation to the self-resonant frequency of the sensor.

When manufacturing the device according to the invention, all evaluation circuits are constructed identically. The natural frequency of each sensor is measured in the noncovered condition, and the value of resistance of the characteristic impedance is selected as a function of the measured self-resonant frequency. The characteristic impedance is inserted into a receptacle mounting and assigned to the sensor in this fashion. Consequently, the evaluation circuit is constructed in such a way that it generates an electric signal, the electric variable of which depends on the resistance value of the characteristic impedance, and said evaluation circuit contains a device which detects the characteristic impedance signal and adjusts the operating frequency assigned individually to each respective sensor as a function of the resistance value of the characteristic impedance. This measure facilitates combining each evaluation circuit with each sensor without having to carry out special adjustments in order to adapt the evaluation circuit to the sensor.

Advantageous variations and modifications of the invention are disclosed in the subclaims.

Additional characteristics and advantages of the invention are disclosed in the following description of one embodiment that is illustrated in the figures.

Figure 2:
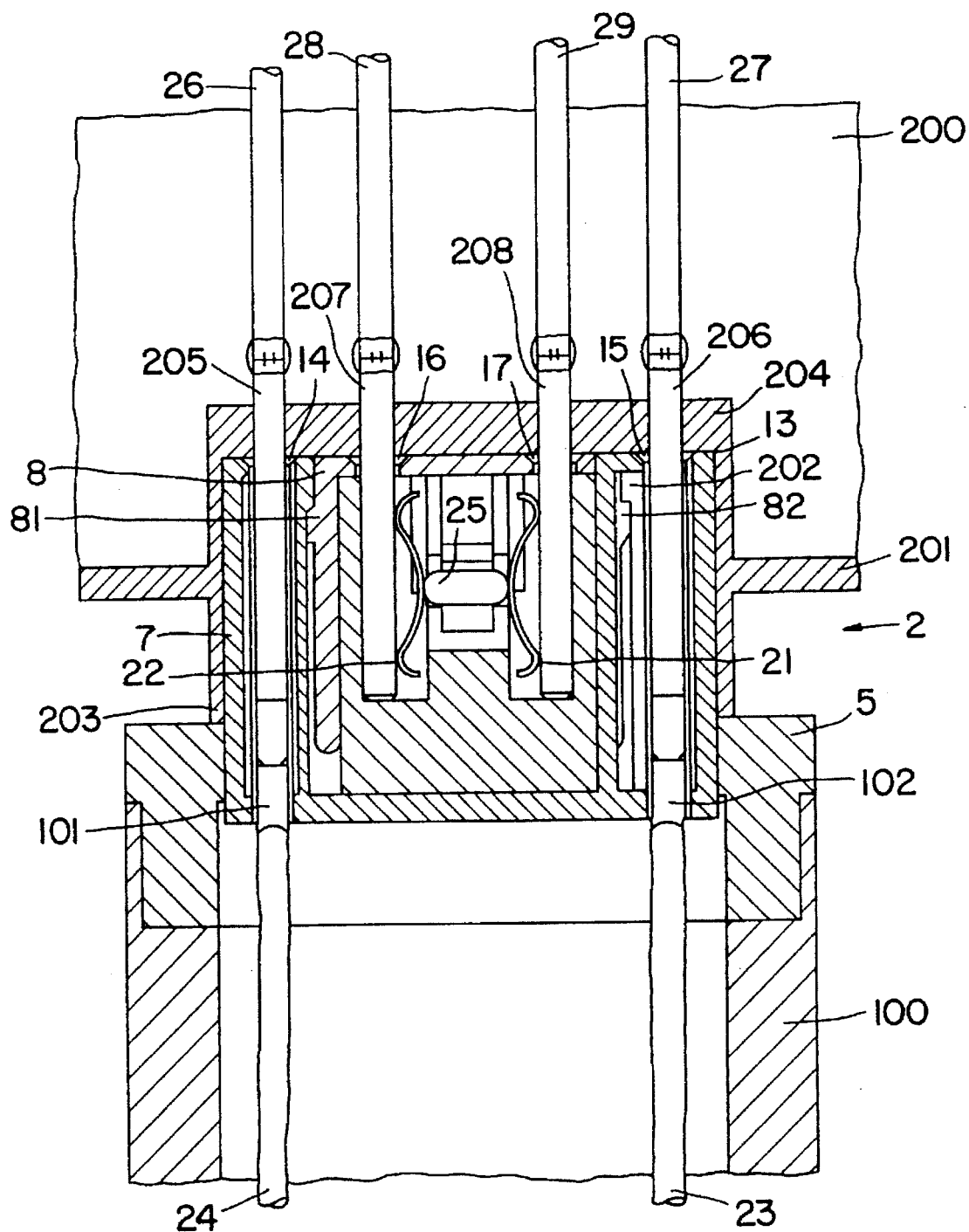
Figure 3:
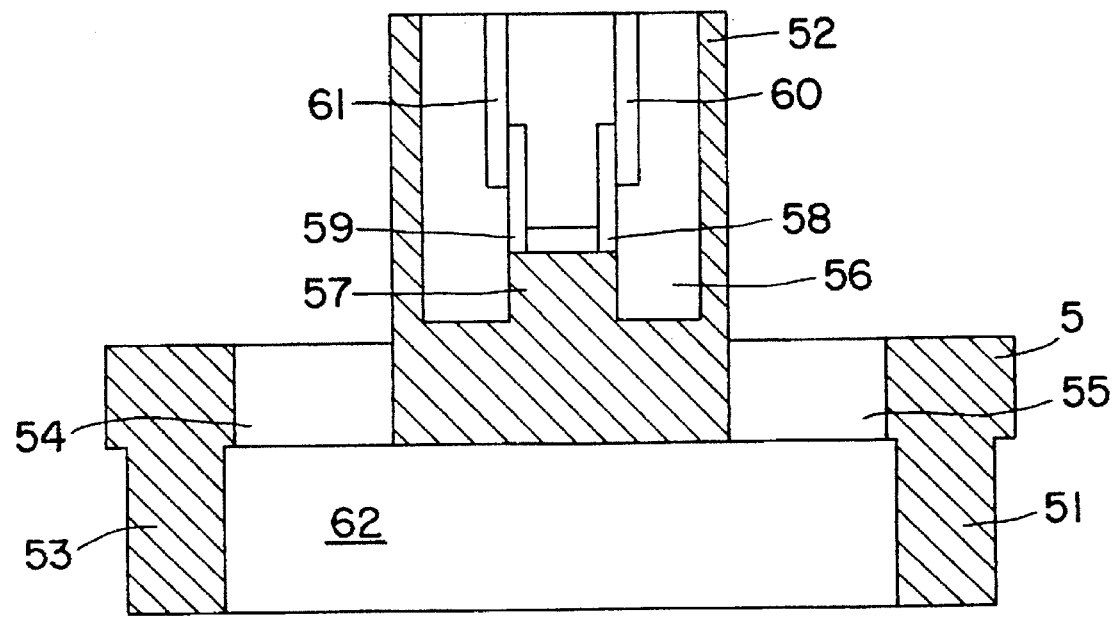
Figure 4:
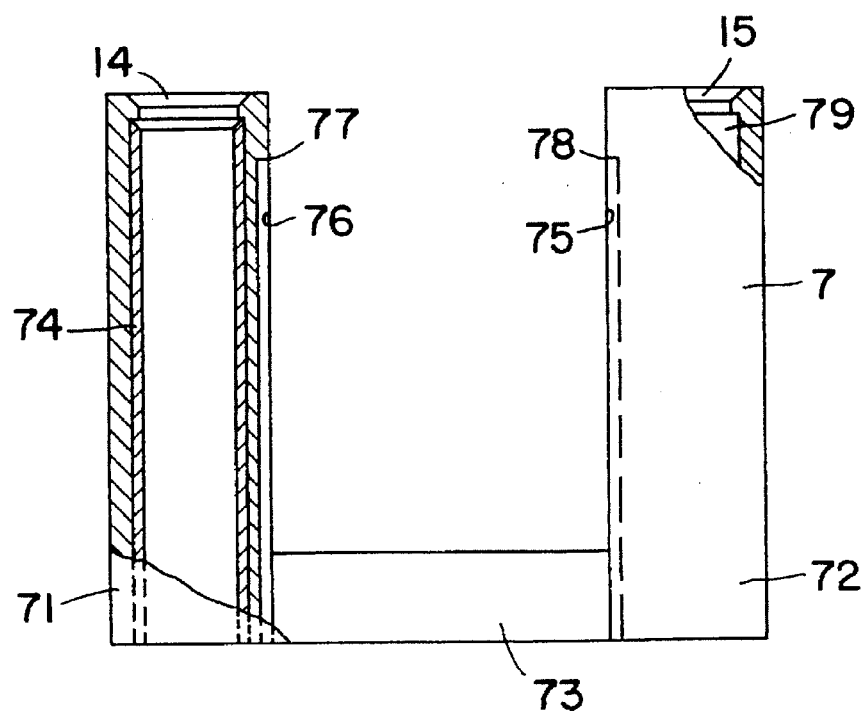
Figure 5:
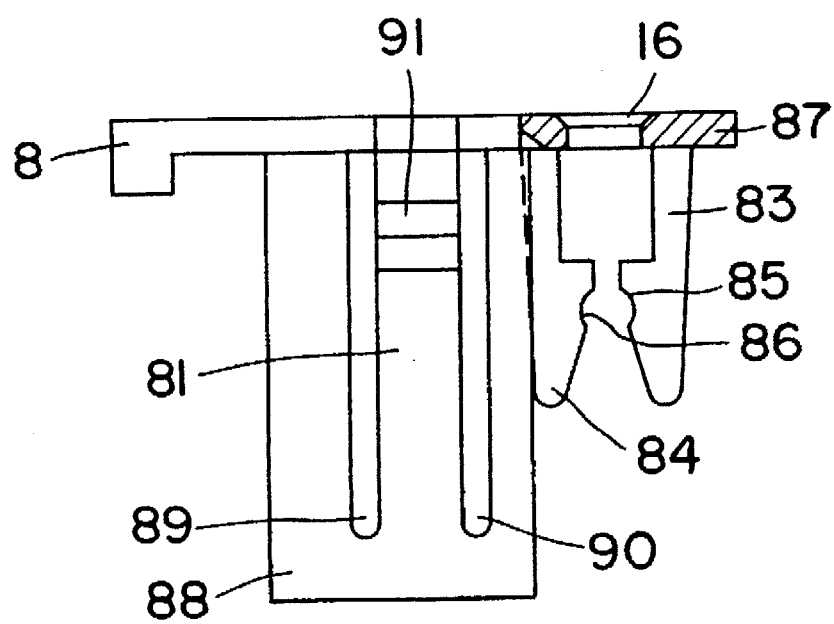

The figures show:

FIG. 1 a view of the device,

FIG. 2 an enlarged, asymmetric longitudinal section through the plug connection in assembled condition, FIG. 3 a section through the receptacle, FIG. 4 a partial section through the socket plug, and FIG. 5 a partial section through the receptacle mounting of the plug connection.

A device for determining and/or monitoring a predetermined level is identified by the reference numeral 1 in FIG. 1. The device consists of the oscillating rods 11,12 of the plug connection 2, the screw insert 3, and the electronics housing 4. The oscillating rods 11,12 protrude into the interior of a not-shown container, the level of which is determined and/or monitored by means of the device 1. The screw insert 3 has a cylindrical shape and has a cylindrical external thread 31 by means of which the device 1 is fastened in the wall of the container, the level of which has to be determined and/or monitored.

In addition, the screw insert 3 has a hex nut 32. The hex nut 32 serves for applying the torque with which the device 1 with the thread 31 is fastened in the internal thread of a bore penetrating through the container wall. A tubular collar 33 adjoins the hex nut 32 at the side opposing the thread 31. The face surface of this collar coincides with the base of the interior space 41 of the electronics housing 4. The interior of the screw insert 3 forms a hollow space 34 in which the not-shown piezoelectric excitation and reception transducer as well as the plug connection 2 is arranged. The piezoelectric excitation and reception transducer is connected to the electronic excitation circuit which is arranged on a printed circuitboard 42 in the interior space 41 of the electronics housing 4 via the plug connection 2. In addition to the excitation circuit for the piezoelectric excitation and reception transducer, the evaluation circuit of the device is also situated on the printed circuitboard 42. In the interior space 41 electrical connecting elements are arranged by means of which the evaluation circuit is connected with an actuator or a display and/or monitoring device that is arranged at a distance from the location at which the measurement is taken. The PG screw connection 43 serves for inserting the connecting line into the electronic housing 4. The interior space 41 is closed by a cover 44. The oscillating rods 11,12 of the piezoelectric excitation and reception transducer, the screw insert 3 including the membrane for the oscillating rods 11,12, and the excitation circuit 42 collectively form the sensor 10 of the device 1.

FIG. 2 shows a section through the plug connection 2. The section illustrated in the figure is asymmetric so as to better explain said plug connection. The plug connection 2 consists of the receptacle 5, the socket plug 7, and the receptacle mounting 8. The receptacle 5 shown in FIG. 3 consists of a cylindrical socket 51 and the mounting housing 52. The cylindrical socket 51 has a section 53 which has a smaller diameter. The section 53 forms the positive connection with a sleeve 100 which is in turn spatially connected to the external encapsulation of the excitation and reception transducer arranged in the sleeve 100. Two openings 54,55 are arranged in the base of the cylindrical socket 51. Said openings serve for accommodating the two prongs 71 and 72 of the socket plug 7. FIG. 2 shows that, in assembled condition, the two prongs 71 and 72 of the socket plug 7 assume a position in the openings 54,55 of the receptacle 5 in which they extend parallel along the outer surface of the socket housing 52 and protrude a short distance beyond the end of said socket housing 52.

The interior of the socket housing 52 is formed by an opening 56 which, originating from the end of the receptacle 5 opposing the cylindrical socket 51, extends in the axial direction for a short distance. The opening 56 has a cross section in the shape of a fourfold-penetrated rhombus. A central base 57 in cooperation with the crosspieces 58,59 and the grooves 60,61 forms the mounting for the two contact springs 21,22. The receptacle 5 may be advantageously manufactured from a plastic material as a molded article.

FIG. 4 shows a partial section through the socket plug 7. The two prongs 71,72 are connected via the crosspiece 73. In assembled condition, the upper edge of the crosspiece 73 is supported at the base of the cylindrical opening 62 of the receptacle 5. The prongs 71,72 enclose a hollow space which is penetrated by a metallic plug socket 74,79. Electrical lines, of which only two lines 23,24 are illustrated in the figures for reasons of simplicity, represent the electrical connection between the excitation and reception transducer and the plug sockets 74,79. The electrical lines 23,24 are connected to the metallic plug sockets 74,79 by means of suitable connecting methods, e.g., a soldering connection 101,102. On the sides of the outer surface of the prongs 71,72 which face each other guide grooves 75,76 are arranged in such a way that the guide grooves 75,76 are situated opposite each other. These guide grooves extend from the crosspiece 73 in the axial direction and penetrate the crosspiece 73 entirely on both sides. However, they do not extend entirely to the other end of the prongs 71,72, but end in a holding edge 77,78, respectively. In assembled condition, the guide grooves 75,76 are intended for accommodating the two opposing springs 81,82 of the receptacle mounting 8. The face surfaces of the prongs 71,72 are penetrated by the openings 14,15.

The receptacle 5 as well as the socket plug 7 may be manufactured advantageously as a molded part of a suitable plastic material.

FIG. 5 shows a partial section through the receptacle mounting 8. The receptacle mounting 8 serves for accommodating and holding the characteristic impedance 25. For this, a resistor holding device formed by two spring legs 83,84 is formed onto the receptacle mounting 8. In this, the inserted resistor 25 is held by the spring legs 83,84 in such a way that the outer surface of the resistor 25 is encircled by supports 85,86 which have a semicircular shape. In addition, the receptacle mounting 8 has a holding plate 87 and guides 88 which oppose each other and extend perpendicular to the holding plate 87, whereby only one of said guides is shown in FIG. 5. The second guide is arranged behind guide 88 in the plane of projection at the opposite side of the holding plate 87. The guides 88 are almost entirely penetrated by two longitudinal slots 89,90. The central crosspiece formed in this way forms the locking springs 81,82. A rectangular locking bar 91 is arranged on the locking springs 81,82. In addition, a bore 16 penetrates the holding plate 87 in alignment with the axis of symmetry of the supports 83,84. It is also possible to manufacture the receptacle mounting 8 as a molded part from a suitable material.

The assembly of the plug connection 2 is carried out in such a way that the electrical connection between the piezoelectric excitation and reception transducer and the plug socket 74,79 is produced via the electric lines 23,24, and the plug sockets 74,79 are inserted into the prongs 71,72 of the socket plug 7 and locked therein. The contact springs 21,22 are inserted simultaneously into the opening 56 of the receptacle 5. After determining the self-resonance frequency of the sensor in uncovered condition and selecting the corresponding characteristic impedance 25, said characteristic impedance is inserted into the receptacle mounting 8. Subsequently, the socket plug 7 is inserted into the openings 54,55 of the receptacle 5. The position of the receptacle 5, the socket plug 7, and the receptacle mounting 8 relative to each other is fixed by attaching the receptacle mounting 8 onto the face side of the mounting housing 52 in the correct position. The subsequent compression of the parts 7 and 8 causes that the characteristic impedance 25 is inserted into the opening 56 and, when adjoining the holding plate 87 at the face side of the mounting housing 52, assumes a position in which it is connected electrically with the contact springs 21 and 22. The receptacle mounting 8 is simultaneously guided by the guides 88 in such a way that the locking springs 81,82 assume a position inside of the guide grooves 75,76, and that the locking bar 91 of the receptacle mounting 8 engages with the holding edges 77,78 of the socket plug 7. The separable connection is formed by clamping the part 5 between the parts 7,8, whereby said connection defines the relative position of the parts in such a way that the socket side of the plug connection 2 is formed and that the characteristic impedance 25 is simultaneously held such that it is connected electrically with the holding springs 21,22.

After assembling the parts 5,7,8, the holding plate 87 assumes a position between the ends of the prongs 71 and 72 such that the surface 13 formed by the face sides of the prongs 71,72 and the rear surface of the holding plate 87 is continuous and only penetrated by the openings 14,15,16, 17.

The electronic excitation circuit and the evaluation circuit are arranged on the printed circuitboard 42 in the interior space of the electronics housing 4. The circuits are enclosed by a pot-shaped insulating body 200 in order to insulate both circuits electrically against the electronics housing 4. Part of the pot-shaped insulating body 200 is illustrated in FIG. 2. The base 201 of the insulating body is not constructed in a continuous planar fashion, but is recessed in the central region and thus forms a plug cavity 202, the surrounding wall 203 of which continues to extend by a certain distance perpendicular from the base 201 and thus forms an insulation encircling the plug connection 2. Adjacent to the base 201, the plug cavity 202 is closed by means of the contact carrier 204. In comparison to the base 201, the contact carrier 204 has a substantially larger wall thickness. The contact carrier 204 is penetrated by cylindrical contact pins 205,206,207,208 in such a way that the contact pins penetrate a small distance into the interior space of the insulating body 200 facing the printed circuitboard 42. The contact pins 205 through 208 may be fastened in the contact carrier 204 by means of any suitable fastening method available to a person skilled in the art. This fastening may, for example, also be carried out by injection-molding around the inserted contact pins.

The pin side of the plug connection 2 is formed by the arrangement of the contact carrier 204 with the contact pins 205 through 208.

The electric lines 26,27,28,29 connected to the contact pins 205 through 208 represent the electrical connection to the printed circuitboard 42. The connection of the electric lines 26 through 29 to the contact pins 205 through 208 may be carried out by means of any connection method available to a person skilled in the art, e.g., by soldering. The closing of the plug connection 2 causes that the contact pins 205,206 are connected electrically to the contact sockets 74,79 while penetrating through the openings 14,15, and that the contact pins 207,208 are simultaneously connected electrically to the contact springs 21,22 while penetrating through the openings 16,17. This means that the contact pins 205,206 are connected electrically to the contact sockets 74,79 via the electric lines 26,27, and that the excitation circuit 42 is connected electrically to the piezoelectric excitation and reception transducer via the electric lines 23,24. The electric lines 28,29, the contact pins 207,208, and the contact springs 21,22 simultaneously close that particular circuit by means of which the characteristic impedance 25 is connected electrically to the evaluation circuit 42.

It is obvious to any person skilled in the art that the electrical connection between the excitation circuit and the piezoelectric excitation and reception transducer and the electrical connection between the characteristic impedance 25 and the evaluation circuit 42 may be easily connected and disconnected via the plug connection 2, thus facilitating the easy combination of each evaluation circuit with any sensor. This measure simplifies repair and maintenance procedures substantially.

The exchange of the characteristic impedance 25 which is associated with assigning arbitrary evaluation circuits 42 to arbitrary sensors 10 may be carried out in an equally simple fashion by pulling the receptacle mounting 8 out and removing and reinsetting the characteristic impedance 25 after separating the plug connection 2 and unlocking the locking bar 91.

I claim:

1. An apparatus for monitoring a predetermined level of filling material in a container, the apparatus having a sensor arranged in the container at the elevation of the level to be monitored so that it comes in contact with the filling material once the filling material has reached the predetermined level, an electronic excitation circuit which excites the sensor to perform mechanical oscillations at its self-resonant frequency via a transducer, and an evaluation circuit for triggering at least one process as a function of the frequency of mechanical oscillations of the sensor, the improvement comprising a characteristic impedance having a value which is a function of the self-resonant frequency of the sensor, and a plug connection being arranged between the electric excitation circuit and the transducer as well as between the characteristic impedance and the evaluation circuit and producing an electrical connection between the electronic excitation circuit and the transducer as well as an electrical connection between the characteristic impedance and the evaluation circuit.

2. The apparatus according to claim 1 characterized by the fact that the plug connection includes a receptacle, a socket plug, and a receptacle mounting for the characteristic impedance.

3. The apparatus according to claim 1, characterized by the fact that the plug connection is arranged in a hollow space of the sensor.

4. The apparatus according to claim 1, characterized by the fact that the plug connection is essentially enclosed by an insulating body.

5. The apparatus according to claim 2, characterized by the fact that the receptacle is formed by a socket and a mounting housing which are formed in one piece.

6. The apparatus according to claim 5, characterized by the fact that contact springs are arranged in an opening of the mounting housing.

7. The apparatus according to claim 6, characterized by the fact that a base, crosspieces, and grooves for accommodating and locking the contact springs are arranged in the opening of the mounting housing.

8. The apparatus according to claim 2, characterized by the fact that the socket plug is constructed as one piece comprising of at least two prongs and one crosspiece connecting the prongs and that the prongs encircle metallic plug sockets.

9. The apparatus according to claim 8, characterized by the fact that opposing guide grooves are formed onto the prongs, whereby the grooves end in holding edges which extend perpendicular to the axis of symmetry of the apparatus.

10. The apparatus according to claim 2, characterized by the fact that the receptacle mounting is constructed in one piece comprising locking springs, spring legs, guides, a locking bar, and a holding plate.

11. The apparatus according to claim 2, characterized by the fact that the receptacle, socket plug, and receptacle mounting are retained in their position relative to each other by means of a separable connection formed by locking springs, locking bars, and the holding edges.

12. The apparatus according to claim 6, characterized by the fact that the characteristic impedance is held in a position in an interior space of the mounting housing in such a way that it is connected electrically to the contact springs.

13. A plug connection for use in a device including a sensor having a self-resonant frequency, an activation circuit which activates the sensor, and an evaluation circuit which receives a signal from the sensor, the plug connection comprising means for providing an electrical connection between the activation circuit and sensor and between the sensor and the evaluation circuit, and a characteristic impedance having a value which is a function of the self-resonant frequency of the sensor, the characteristic impedance being situated only within the electrical connection between the sensor and evaluation circuit.

* * * * *